(12) United States Patent
Jain et al.

(10) Patent No.: US 7,769,026 B2
(45) Date of Patent: Aug. 3, 2010

(54) EFFICIENT SORT SCHEME FOR A HIERARCHICAL SCHEDULER

(75) Inventors: Sanjeev Jain, Shrewsbury, MA (US); Mark Rosenbluth, Uxbridge, MA (US); Gilbert Wolrich, Framingham, MA (US)

(73) Assignee: Intel Corporation, Santa Clara, CA (US)

( * ) Notice: Subject to any disclaimer, the term of this patent is extended or adjusted under 35 U.S.C. 154(b) by 1018 days.

(21) Appl. No.: 11/389,650

(22) Filed: Mar. 23, 2006

(65) Prior Publication Data

US 2007/0223504 A1  Sep. 27, 2007

(51) Int. Cl.
*H04L 12/28* (2006.01)
(52) U.S. Cl. ............... 370/395.4; 370/229; 370/395.41; 370/395.42; 370/395.43; 370/412; 370/465
(58) Field of Classification Search ............... 370/395.4, 370/395.41, 395.42, 395.43, 229, 465, 412, 370/394
See application file for complete search history.

(56) References Cited

U.S. PATENT DOCUMENTS

| | | | |
|---|---|---|---|
| 6,850,490 B1 * | 2/2005 | Woo et al. | 370/230 |
| 6,975,629 B2 * | 12/2005 | Welin | 370/392 |
| 7,075,934 B2 * | 7/2006 | Chiussi et al. | 370/395.41 |
| 7,110,411 B2 * | 9/2006 | Saidi et al. | 370/395.4 |
| 7,246,198 B2 * | 7/2007 | Nataraj et al. | 711/108 |
| 7,257,084 B1 * | 8/2007 | Srinivasan et al. | 370/235 |
| 2006/0140191 A1 | 6/2006 | Naik | |
| 2006/0140192 A1 | 6/2006 | Jain et al. | |
| 2006/0140201 A1 | 6/2006 | Kumar et al. | |

* cited by examiner

*Primary Examiner*—Dang T Ton
*Assistant Examiner*—Frederick Ott
(74) *Attorney, Agent, or Firm*—Caroline M. Fleming (57) ABSTRACT

Scheduling of packets is performed by a scheduler based on departure times. If wrap up of departure times is possible, departure times are transposed based on a zone associated with the last departure time. By using the zone to transpose in order to sort departure times, cycles of independent checks on each of the departure times are avoided.

27 Claims, 7 Drawing Sheets

EFFICIENT SORT SCHEME FOR A HIERARCHICAL SCHEDULER

FIELD

This disclosure relates to multithreaded multiprocessor systems and in particular to performing sorts with a reference point.

BACKGROUND

A network processor is a programmable device that is optimized for processing packets at high speed. As the processing time available for processing received packets decreases in proportion to the increase in the rate at which packets are transmitted over a network, a network processor may include a plurality of programmable packet-processing engines to process packets in parallel. The packet-processing engines run in parallel, with each packet processing engine (micro engine) handling packets for a different flow (or connection) which may be processed independently from each other.

Some of the packet processing engines may be used to perform a scheduling function that determines the order in which packets are de-queued after they have been processed. A scheduler may be hierarchical, that is, may implement more than one level of scheduling schemes. For example, a hierarchical scheduler may implement three-level inline scheduling with three different schemes at the 3 levels i.e. by implementing weighted round-robin (WRR) scheduling on ports, strict priority scheduling among groups of queues per port, and Deficit Round Robin (DRR) scheduling among queues within a queue group. The queue, queue group and ports that constitute the three levels of the hierarchy are typically referred to as nodes.

Typically, a scheduler uses packet departure time as selection criterion for de-queuing packets. This involves finding the packet that has the earliest departure time by first sorting the departure times of queued packets in either ascending or descending order. However, as the number of bits allocated for storing a packet's departure time is limited, departure times wrap around when they cross over the number of allocated bits. To check for departure time wrap occurrence, a scheduler typically explicitly checks each departure time.

In addition to checking for departure time wrap occurrence, a scheduler may also exclude nodes that are rate limited (use a token based scheduling scheme) from the sort calculation and may schedule priority packets ahead of other non priority packets. Checking for departure time wrap around, rate limited nodes and priority packets requires additional compute cycles, for example, additional compute cycles to perform check-and-branch instructions. These additional instructions reduce available compute bandwidth for scheduling packets.

Furthermore, in a hierarchical scheduler a selection process is performed at each level of the hierarchy. Determining a packet to advance through the hierarchy needs to be performed very efficiently, as multiple selections are required for scheduling each packet.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Hierarchical scheduling is a method used to schedule packets so that the link capacity of intermediate hops within the hierarchy is not exceeded. At each level of the hierarchy, a selection of the best packet to move forward to the next level is made based on a selection criteria. For example, the selection criteria may be based on departure time for a packet from a node in the hierarchy. Once a selection of the best packet is made, the selected best packet is moved forward to a next node at the next level in the hierarchy.

Typically, in order to check for departure time wrap, rate limited nodes and schedule priority packets, packets are first sorted into different buckets, one for priority packets, one for non-priority packets and another for rate limited nodes before performing the sort on the buckets with packets in the priority bucket being scheduled first.

In an embodiment of the present invention, instead of sorting through all of the departure times of all the queued packets prior to selecting the packet to move forward, departure times are ordered based on a zone that is associated with each departure time. Thus, by adding a zone bit to departure times, instead of checking each individual departure time in order to sort the departure times in ascending order, only the zone bit of the last departure time is checked.

Figure 1:
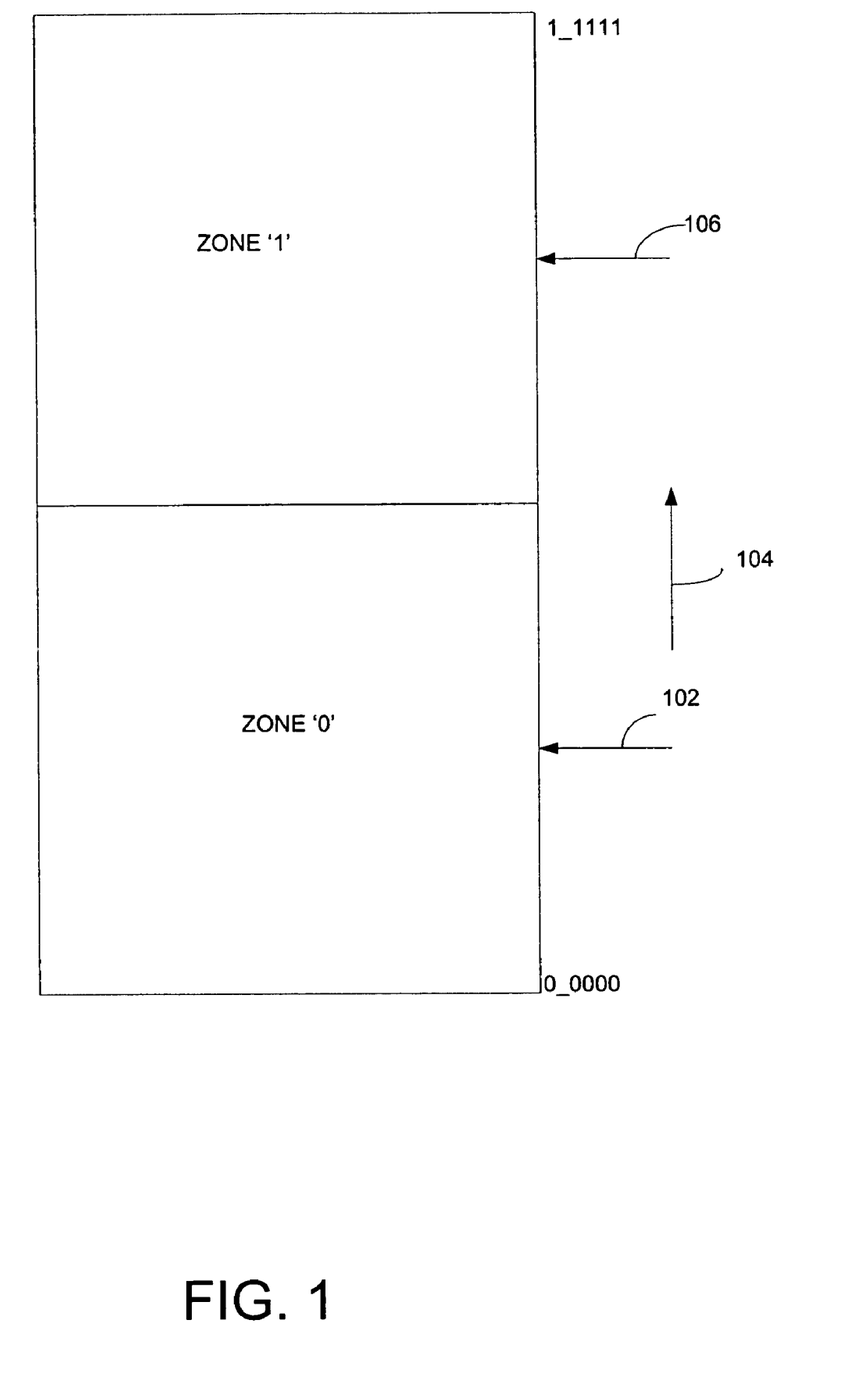
FIG. 1 illustrates an example of a spread of departure times in which departure times for queued packets do not wrap around.
Figure 2:
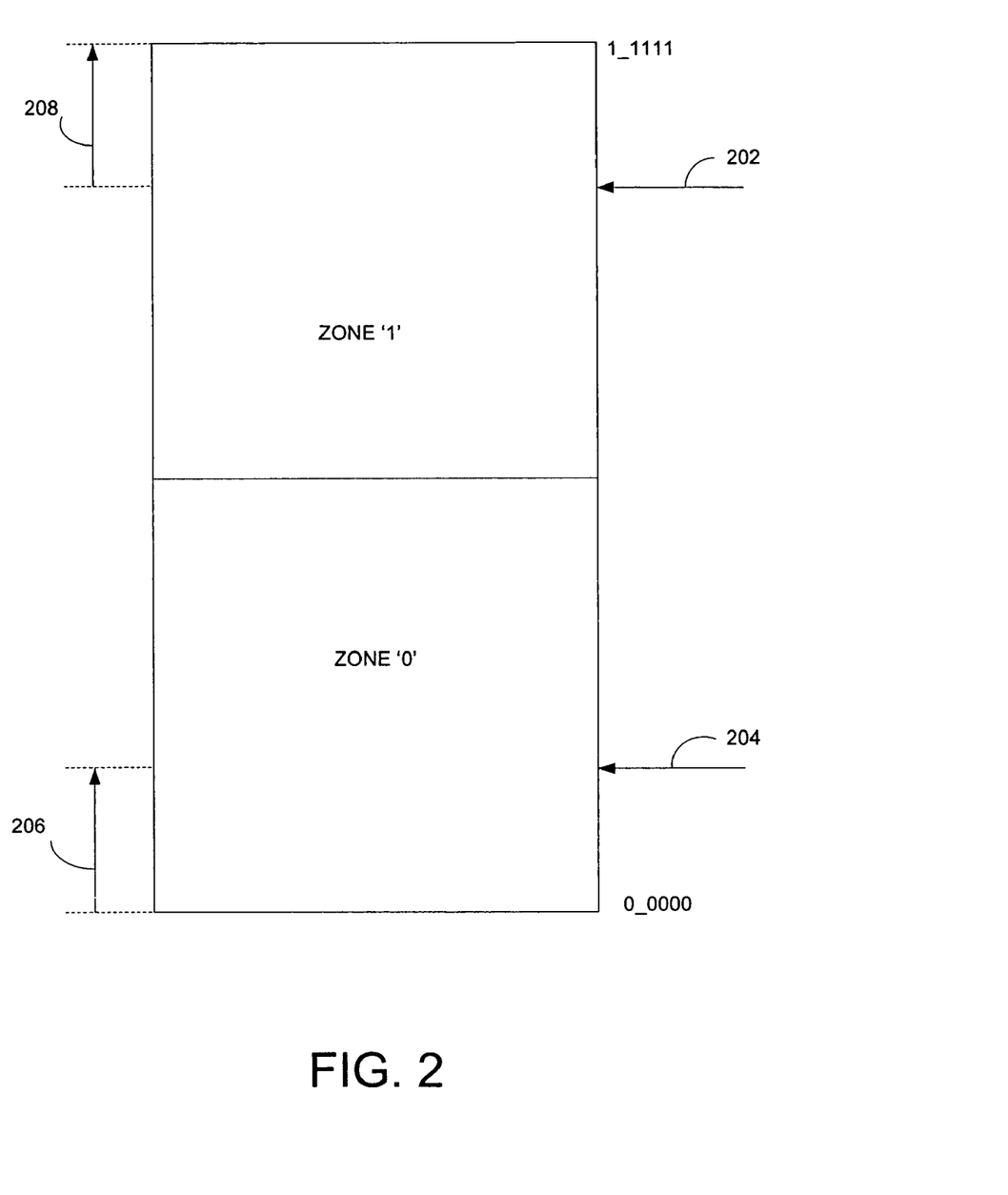
FIG. 2 illustrates an example of a spread of departure times in which departure times for queued packets wrap around.

FIGS. 1-2 illustrate a spread of departure times for queued packets over two zones. By way of illustration, in the embodiment shown, the departure time has 4 bits and one additional bit is used to indicate which of two zones are associated with the departure time. Thus, departure times range from 0000 through 1111 and each departure time may be in zone '0' or zone '1'. The total spread of the departure times is equal to the size of a single zone, that is, 0000 to 1111, with zone '0' departure times ranging from 0_0000 to 0_1111 and zone '1' departure times ranging from 1_0000 to 1_1111.

FIG. 1 illustrates an example of a spread of departure times in which departure times for queues in a node do not wrap around. The node's last departure time 102 is in zone '0' and future departure times are spread upwards in direction 104 into zone '1' to departure time 106. In this case, with the node's last departure time in zone '0', all future departure times are greater than the current node's last departure time and no reordering is required. For example, if the node's departure time 102 is 0__0100 in zone '0' and departure time 106 in zone '1' is 1__0100, then all future departure times are greater than 0__0100.

FIG. 2 illustrates an example in which departure times for queues wrap around. The node's last departure time 202 is in zone '1'. The future departure times start at the node's last departure time 202 upwards in direction 208 to 1__1111 and then wrap around to the start of zone '0' at 0__0000 and extend upwards in direction 206 to departure time 204 which is in zone '0'. In this case, future departure times in zone '0' which are later than future departure times in zone '1' have values that are less than the node's last departure time which can result in an incorrect scheduling order.

However, the order can be maintained by transposing the zone prior to performing the sort when node's last departure time is in zone '1'. For example, in this embodiment, by transposing the zone bit (Most Significant bit (MSb) of the departure time) such that the departure times including 1__1111 in the top of zone 1 are moved to the top of zone '0', for example, 1__1111 is moved to 0__1111 and the departure times at the bottom of zone '0' starting at 0__0000 are moved to the bottom of zone '1' starting at 1__0000 results in a departure time spread as shown in the example of departure time spread shown in FIG. 1.

Thus, wrap around problems can be avoided by transposing the zone bit corresponding to the MSb of the departure time when the node's last departure time is in Zone '1' indicating that the future departure times are spread between Zone '1' and Zone '0'. Thus, the zone bit acts like a guard band between the two zones. By providing two zones through the zone bit, instead of having to check each departure time, only the zone field in the node's last departure time needs to be checked. This results in a decrease in the time to sort departure times in order to select the best packet to forward to the next level.

An embodiment of the invention will be described for a network processor.

Figure 3:
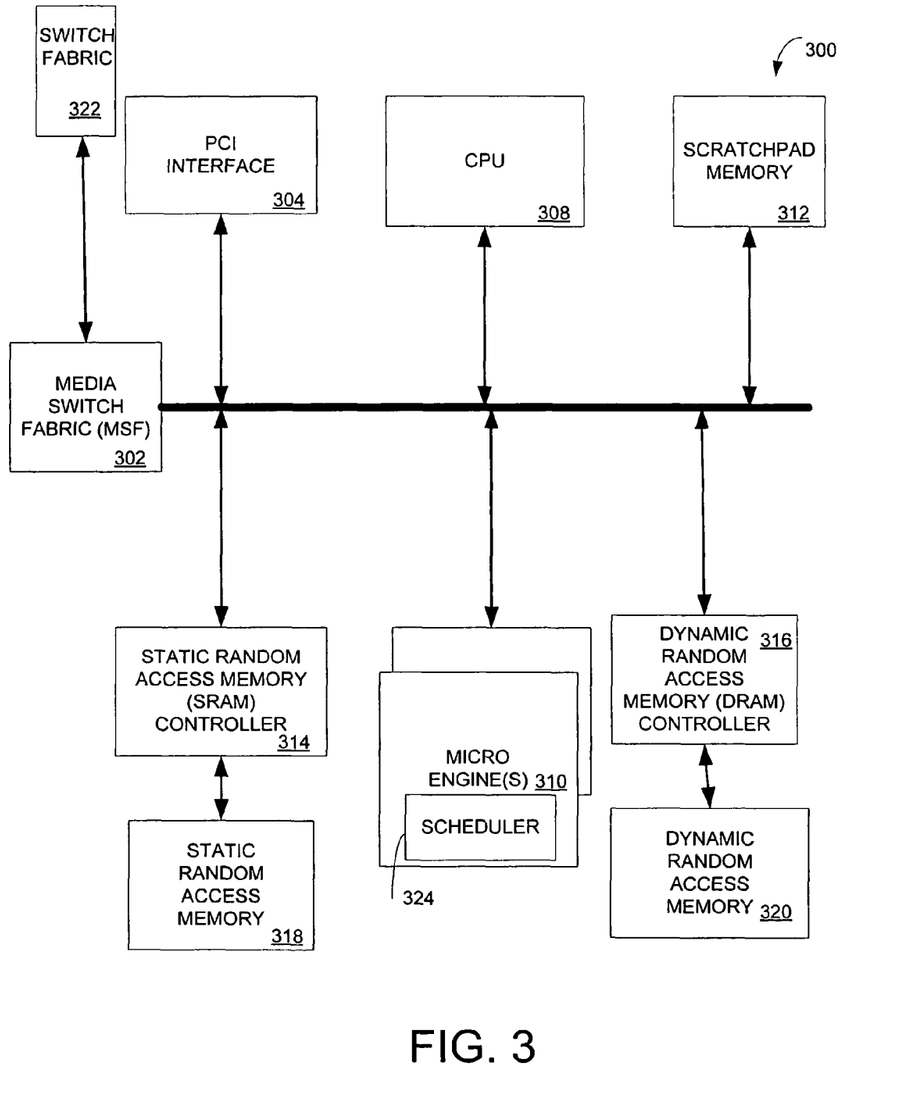
FIG. 3 is a block diagram of an embodiment of a network processor that includes an embodiment of a scheduler according to the principles of the present invention.

FIG. 3 is a block diagram of a network processor 300 that includes an embodiment of a scheduler according to the principles of the present invention.

The network processor 300 includes a Media Switch Fabric (MSF) interface 302, a Peripheral Component Interconnect (PCI) interface 304, memory controllers 314, 316, memory 312, 318, 320, a processor (Central Processing Unit (CPU)) 308 and a plurality of micro engines (packet processing engines) 310.

Network processing has traditionally been partitioned into control-plane and data-plane processing. Data plane tasks are typically performance-critical and non-complex, for example, classification, forwarding, filtering, headers, protocol conversion and policing. Control plane tasks are typically performed less frequently and are not as performance sensitive as data plane tasks, for example, connection setup and teardown, routing protocols, fragmentation and reassembly.

In an embodiment, each micro engine 310 is 32-bit processor with an instruction set and architecture specially optimized for fast-path data plane processing. In one embodiment, there are sixteen multi-threaded micro engines 310, with each micro engine 310 having eight threads. Each thread has its own context, that is, program counter and thread-local registers. Each thread has an associated state which may be inactive, executing, ready to execute or asleep. Only one of the eight threads can be executing at any time. While the micro engine 310 is executing one thread, the other threads sleep waiting for memory or Input/Output accesses to complete.

Any micro engine may be used as a scheduler 324 which manages forwarding of packets stored in queues based on a scheduling policy. In some cases more than one micro-engine may be used to perform scheduling functions where each micro-engine may execute each level of the scheduling hierarchy. The scheduler 324 in a micro engine 310 may manage one or more levels (nodes) of a scheduling hierarchy and the schedulers 324 of a plurality of micro engines manage scheduling of packets through the network processor 300 so that a fixed bandwidth of links between nodes in the hierarchy is not oversaturated resulting in dropped packets.

The Central Processing Unit (CPU) 308 may be a 32 bit general purpose Reduced Instruction Set Computer (RISC) processor which may be used for offloading control plane tasks and handling exception packets from the micro engines 310. In one embodiment the CPU 308 may be an Intel XScale processor.

The Static Random Access Memory (SRAM) controller 314 controls access to SRAM 316 which is used for storing small data structures that are frequently accessed such as, tables, buffer descriptors, free buffer lists and packet state information.

The Dynamic Random Access Memory (DRAM) controller 316 controls access to DRAM 320 for buffering packets and large data structures, for example, route tables and flow descriptors that may not fit in SRAM 316.

The embodiment of the network processor 300 shown in FIG. 3 includes both SRAM 316 and DRAM 320. In another embodiment, the network processor 300 may include only SRAM 316 or DRAM 320.

The scratchpad memory 312 may store hardware-assisted ring buffers for communication between micro engines 310. In an embodiment, the scratchpad memory 312 is 16 Kilobytes. Control Status registers that may be accessed by the micro engines 310 are stored in the scratchpad memory 312.

The MSF interface 302 buffers network packets as they enter and leave the network processor 300. The packets may be received from and transmitted to Media Access Control (MACs)/Framers and switch fabrics 322. In another embodiment, the MSF interface 302 may be replaced by a MAC with Direct Memory Access (DMA) capability which handles packets as they enter and leave the network processor 300 or a Time Division Multiplexing (TDM) Interface.

Figure 4:
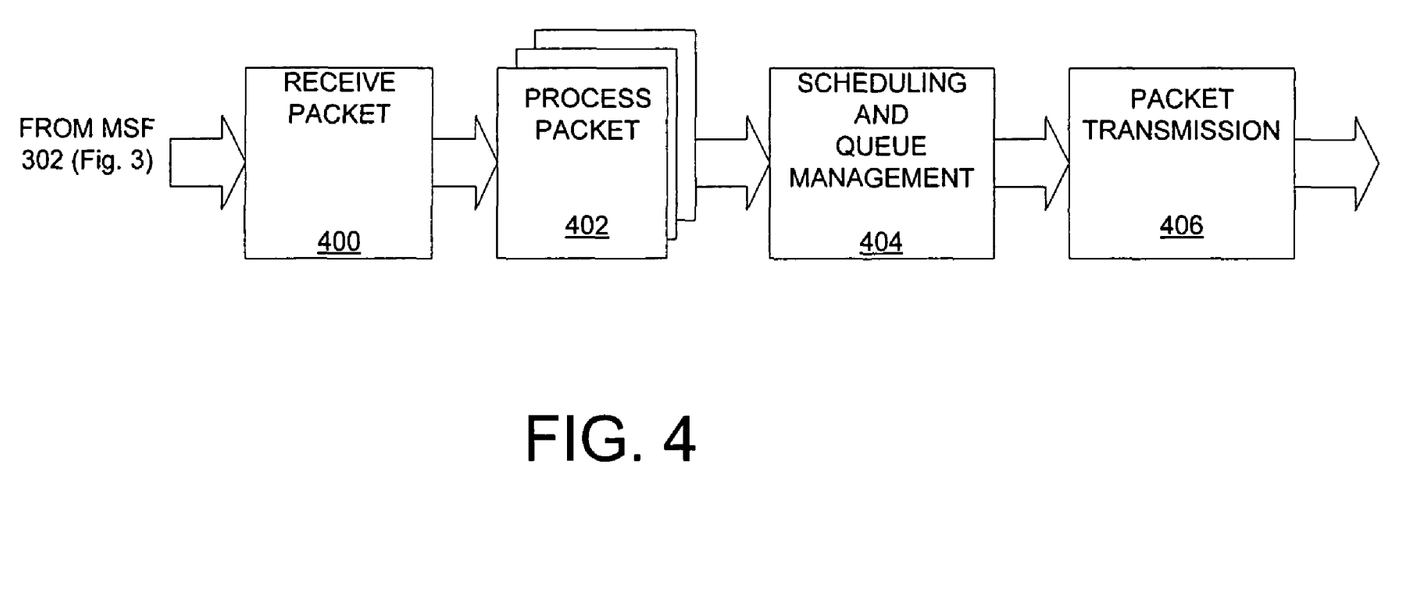
FIG. 4 is a logical view of fast-path data plane processing for a received packet in the network processor shown in FIG. 3.

FIG. 4 is a logical view of fast-path data plane processing for a received packet in the network processor 300 shown in FIG. 3. FIG. 4 will be described in conjunction with FIG. 3. The Media Switch Fabric (MSF) interface 302 (FIG. 3) receives packets as fixed size segments and buffers them in a receive buffer.

A packet receive module 400 reassembles the fixed-size segments received from the MSF interface 302 (FIG. 3) into complete packets and stores the packets (including headers and payload) in DRAM 320 (FIG. 3). In an embodiment in which the MSF interface 302 is replaced by a MAC with DMA capability, the packet receive module 400 receives packets directly from the MAC and thus does not need to reassemble the fixed-size segments. The packet receive module 400 also stores per packet state information in a packet descriptor associated with the packet in SRAM 318 (FIG. 3) and stores a handle (pointer to a location in memory) in a ring buffer in the scratchpad memory 312 (FIG. 3) that identifies where the packet is stored in DRAM 320. After the packet has been received and its handle stored in a ring buffer, it is ready to be processed.

Packet processing 402 is performed in the micro engines 310 (FIG. 3). Multiple micro engines 310 run in parallel and one of the eight threads in each micro engine 310 handles one packet at a time and performs data plane processing tasks on it. Each thread reads in a message stored in a ring buffer in the scratchpad memory 312 (FIG. 3). The message includes a packet handle (pointer to a location in DRAM storing the packet) and other per-packet state.

Using the packet handle, the thread reads headers from the packet stored in DRAM 320 and the packet descriptor stored in SRAM 318 and performs various packet-processing tasks. The packet headers, descriptor and other per packet state is read into the micro engine 310 once, cached in local memory or registers and in the micro engine 310 and used by all the packet processing tasks. Access to data structures that are shared across multiple packets may be synchronized across multiple micro engines 310. If the packet processing tasks result in modifying the packet header, the modified header is written back to DRAM 320 and the modified descriptor is written back to SRAM 318. After the packet processing tasks have been completed, the thread writes an enqueue message that includes the packet handle and associated transmit queue information for the packet to a queue in the scratchpad memory 312 that is serviced by the scheduling and queue management module 404.

The scheduling and queue management module 404 determines the order in which packets are dequeued and sent to the transmit module 406. The dequeue packet handles are written to a queue in the scratchpad memory 312 which is serviced by the transmit module 406.

The scheduling and queue management module 404 includes a scheduler 324 (FIG. 3) and a buffer manager. The scheduler 324 maintains data structures that allow it to determine which queues are non-empty, track which queues are flow-controlled and determine which queue is most eligible to send a packet, per a scheduling policy. The scheduling policy may use scheduling algorithms such as WFQ (Weighted Fair Queuing), WRR (Weighted Round Robin), strict priority and Deficit Round Robin (DRR). The buffer manager handles dropping of packets on congested links based on algorithms such as Weighted Random Early Detection (WRED) for congestion avoidance.

The scheduler 324 may group the queues into a hierarchy and a different scheduling algorithm may be used for each level of the hierarchy. Conceptually the different levels of the hierarchy are a pipeline and may be implemented in one micro engine or a plurality of micro engines.

The packet transmission module 406 receives a packet handle from the scheduling and queue management module 404 and prepares packets for transmission based on the schedule provided by the scheduler in the scheduling and queue management module 404. The transmit module 406 segments the packet into fixed size segments and transmits them over the MSF interface 302.

Received packets are stored temporarily in queues prior to being transmitted, each queue has an associated queue data structure having fields for storing an indication as to whether the packet belongs to a priority class, whether the packet is rate limited and for storing a departure time assigned to the packet. The queued packets are sorted in order to find the best packet to be promoted to the next level of the hierarchy.

Figure 5:
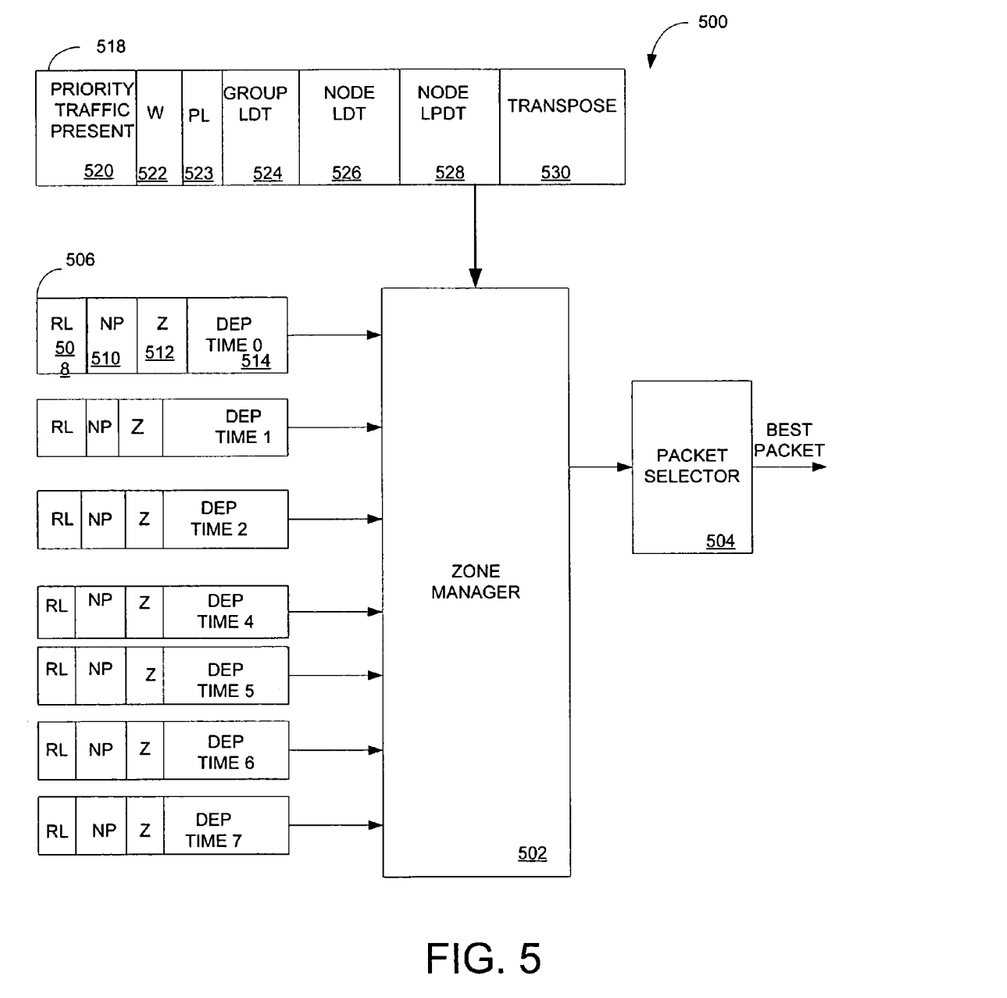
FIG. 5 is a block diagram of an embodiment of a scheduler for selecting a best packet to move forward to a next level of a hierarchy according to the principles of the present invention.

FIG. 5 is a block diagram of an embodiment of a scheduler 500 for selecting a best packet to move forward according to the principles of the present invention. The scheduler 500 includes a zone manager 502 and a packet selector 504. In the embodiment shown a packet is selected from a group of 8 queues which are represented by a level in the hierarchy.

Each of the eight queues for storing packets has an associated queue data structure 506 that includes a rate limited (RL) field 508; a non-priority (NP) field 510, a zone field 512 and a departure time field 514.

The number of compute cycles required to control departure time wrap around when departure times cross the number of bits allocated for departure times is reduced by dividing the departure time into two zones. A departure time is in zone '0' when the Most Significant bit (MSb) of the departure time is '0', that is, the zone field 512 is '0', and a departure time is in zone '1' when the MSb of the departure time is '2'.

The group of queues is also associated with a node data structure 518 that includes a weight (W) field 520, a packet length (PL) field 522, a group's Last non priority departure time (LDT) field 524, a, node's last priority departure time (LPDT) field 528 and a transpose field 530. The node's weight (W) multiplied by the packet length (L) is defined as time delta.

A packet's departure time is calculated based on (1) a group's last priority departure time (LPDT) if the packet is a priority packet, (2) a group's last departure time (LDT) if the packet is a non priority packet or (3) if the node was empty earlier, LDT+Time Delta is the departure time for the non priority packet and LPDT+Time Delta is the departure time for the priority packet. Time delta is added to LDT or LPDT to calculate a non empty node's new departure time.

A group's Last Departure Time (LDT or LPDT) is the departure time metric of the packet that was last moved forward from this grouping. This time represents the complete group as a whole and is not dependent on whether the group is associated with a single level (node) or includes many sub-levels (nodes).

Each node in the hierarchy stores two departure times in the node data structure 518: one for priority traffic (LPDT) and one for non-priority traffic (LPDT). Along with this, an additional field "Priority Traffic Present" 520 is used to indicate whether priority traffic is present in the node. If the "Priority Traffic Present" field 520 indicates the priority traffic is present, the departure time for priority traffic and associated zone field 512 in the queue data structure 506 is used in the zone management.

The priority traffic, if present, based on the state of the "Priority Traffic Present: field 520 always moves first unless the priority traffic is rate limited. If priority traffic is rate limited as indicated by the RL field 508 in the queue data structure 506, a token fill procedure moves the priority packet forward if space exists at the next node in the hierarchy. As is well-known to those skilled in the art, a token fill scheme based on single or dual rate metering function is used to calculate tokens. A packet before moving forward checks if enough tokens are available in the bucket. If enough tokens are not available, packet is rate limited and waits till enough tokens are added by above defined algorithm. At that point packet moves forward if room exists at the next level of the hierarchy.

A node's departure time or last departure time (LDT) which is selected from the non-priority LDT 526 or priority LPDT 528 is used by the scheduler 500 to find the best packet. After a node's last packet has been transmitted, the LDT (non priority) or LPDT (priority) stores the last departure time for the node and can be used when a queue in the node becomes non-empty. When the queue goes non-empty, that is, a packet is added to the queue, a decision is made whether to use the LDT (non-priority) or the group LPDT(priority) dependent on the packet.

A Node's Weight (W) defines the ratio of the rate of fastest queue/node in the group and the rate defined for the node. For example, if the fastest node in the group is 10 Mbps and the rate defined for the node is 128 Kbps then the weight for this node is 10 Mbps/128 kbps=78. The weight may also be defined using other methods if the ratio of fastest and other queues is not an integer number. For example, if a group has flows with rate of 5, 3, 3, 7, their weights (inverse of the rate) can be assigned as 1/5, 1/3, 1/3 and 1/7. So the integer values (by multiplying weights by (5×3×7)) for this will be 21, 35, 35, and 15.

Thus, packets with higher weights are delayed more than packets with lower weights.

In one embodiment, the Received Packet Length (PL) has 12 bits that provides for the support of up to 16 KB packet size in 4 B granularity or 64 KB in 16 B granularity.

The departure time metric is used as a reference point to sort the packets and has no direct relationship with the current real time. Based on the node's weight, the packet length and last departure time, a new departure time for a node is calculated as follows: If the queue was empty then LDT or LPDT becomes the last departure time. If the queue was non empty, then LDT+(PL*W) is the new departure time for non-priority queue and LPDT+(PL*W) is the new departure time for the priority queue. In an alternate embodiment, accuracy of the scheme is improved for queue empty case, as follows: If the queue goes empty as part of the packet promotion process, the departure of the packet is unchanged for the queue departure time slot. Let's call it current departure time for queue (CDT) and set it in empty state. An empty state bit is added to the queue structure . When a new packet arrives to this queue, the empty state defines that CDT is the time to use. The new departure time is calculated for the packet using CDT+(PL*W). If the new time is ahead of Last departure time for that class of packet but still within the zone spread, the new value is used otherwise LDT+(PL*W) is used as the new departure time (or LPDT+PL*W as new departure time for priority packet).

The queue data structures 506 for queue are read by a zone manager 502 and forwarded to a packet selector 504. The zone field 512 of the queue node structure 506 stores the MSb of the departure time and is used to manage the departure times. All the data is read once and the departure time is read from the node data structure 518 based on the state of the priority traffic field 520. The zone manager 502 transposes the packet departure times based on the state of the zone field for the selected departure time. Based on the zone of the last departure time, the zone bits for the packet at the head of each queue are "transposed" using a simple Exclusive XOR operation if the zone bit of the last departure time is '1'. Otherwise no transposition is needed. The packet selector 504 sorts all the data forwarded from the zone manager 502 based on the state of the priority (NP) 510 field of each queue data structure 512 and forwards the best packet to the next level in the hierarchy.

If priority traffic is not present, as indicated by the state of the priority traffic present field 520 in the node data structure 518, the MSb of the non-priority Last Departure Time identifies the zone. When priority traffic is present, non priority traffic does not take part in the sort. Similarly, Rate Limited traffic as indicated by the state of the RL field 508 in the queue node structure 512 can be ignored. If a Rate Limited packet is selected as the best packet, the selection is ignored and the higher level node where the selected packet is to be transmitted is left un-occupied. Instead, the Rate Limited packet moves forward to the next higher level node when a token-fill routine fills tokens.

By ignoring rate limited nodes and scheduling traffic in the group that belongs to a priority class ahead of non priority class traffic, compute cycle expansions are controlled.

Figure 6:
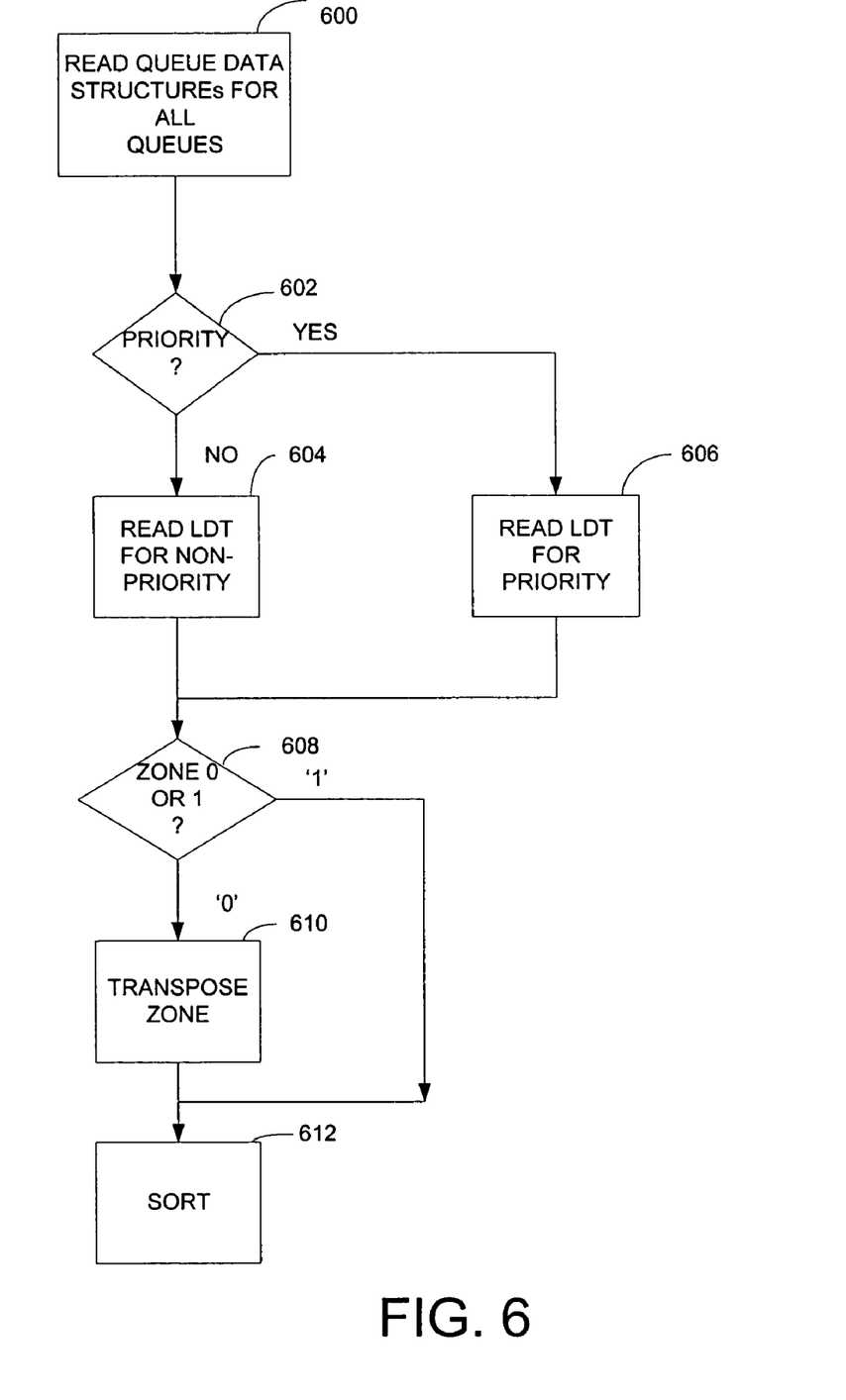
FIG. 6 is a flow diagram of an embodiment of a scheduling method implemented in the scheduler shown in FIG. 5.

FIG. 6 is a flow diagram of an embodiment of a scheduling method implemented in the scheduler 500 shown in FIG. 5.

At block 600, the queue data structures 506 are read for all queues. Processing continues with block 602.

At block 602, if priority is present, that is, the state of the priority field 510 in the queue data structure 506 indicates that the packet is a priority packet, processing continues with block 604. If not, processing continues with block 606.

At block 604, the priority LDT stored in the priority LDT field 528 is read from the queue data structure 518. Processing continues with block 608.

At block 606, the non-priority LDT stored in the non-priority field 512 is read from the queue data structure 518. Processing continues with block 608.

At block 608, the state of the zone field 512 in the queue data structure 518 is checked. If the zone is '1', processing continues with block 610. If the zone is '0', processing continues with block 612.

At block 610, the transpose field 530 in the node data structure is configured to indicate that the zone is to be transposed. The zone of the departure times for queued packets at the head of each of the queues are transposed by the zone manager 502 prior to providing the departure times to the packet selector 504. Processing continues with block 612.

At block 612, the packet selector 504 sorts the departure times to find the packet with the best departure time. During the sort process, any queue that is rate limited, as indicated by the state of the RL field 508 in the queue data structure 506 is not considered and queues with priority packets as indicated by the NP field 510 are sorted before queues with no priority packets.

Table 1 below illustrates example queue departure times stored in the departure time field 514 of queue data structures 506 associated with an embodiment with eight queues labeled Q0-Q7 and the current LDT:

TABLE 1

| | |
|---|---|
| Q0: | empty |
| Q1: | 0_1110_1100 |
| Q2: | 0_1111_1111 |
| Q3: | 0_1110_0101 |
| Q4: | 0_1110_0101 |
| Q5: | 0_1110_0011 |
| Q6: | 0_1101_0010 |
| Q7: | 0_1111_0000 |
| LDT: | 0_0000_0000 |

Referring to FIG. 6, at block 600, the queue data structure 506 associated with each of the queues is read in order to select the queue with the earliest departure time. In this example, Q6 has the earliest departure time.

At block 602, there is no priority present, so processing continues with block 604 to read the non-priority LDT stored in the non-priority field 526 of the node data structure 518 for the group. In this example the initial non-priority LDT is 0_0000_0000.

At block 604, the zone of the current LDT is '0', thus, no transposition is needed.

At block 608, the sort function is performed without any transpose on the departure times stored in the queue data structures 506. Based on the result of the sort, Q6 is selected to be the queue with the best packet because it has the earliest departure time, that is, 0_0100_0010. The packet in Q6 is promoted forward and the next packet for Q6 is fetched.

Based on the packet length and queue weight, the departure time for the next packet for Q6 is computed using LDT+ PL*W, the result is the new departure time for Q6. The updated value for the departure time for Q6 is 1_0001_0110. The current LDT for non-priority is 0_1101_0010, that is, the LDT of the selected queue, Q6. Thus, after the packet in Q6 is promoted, the departure time for each of the eight queues and the LDT is as shown in Table 2 below:

TABLE 2

| | |
|---|---|
| Q0: | empty |
| Q1: | 0_1110_1100 |
| Q2: | 0_1111_1111 |
| Q3: | 0_1110_0101 |
| Q4: | 0_1110_0101 |
| Q5: | 0_1110_0011 |
| Q6: | 1_0001_0110 |
| Q7: | 0_1111_0000 |
| LDT: | 0_1101_0010 |

The next time that a packet is selected to be promoted, at block 608, as the zone of the current LDT is '0' no transposition is necessary to maintain the order of the departure times.

Table 3 below is another example of departure times stored in the queue data structures 506 shown in FIG. 5. As shown, the zone in each respective departure time is '1'.

TABLE 3

| | |
|---|---|
| Q0: | empty |
| Q1: | 1_1110_1100 |
| Q2: | 1_1111_1111 |
| Q3: | 1_1110_0101 |
| Q4: | 1_1110_0101 |
| Q5: | 1_1110_0011 |
| Q6: | 1_1101_0010 |
| Q7: | 1_1111_0000 |
| LDT: | 0_1111_1110 |

The initial value of the LDT is 0_1111_1110. The zone of LDT, that is, the MSb is "0", thus no transposition is needed. The sort function is performed by the packet selector 504 on the departure times stored in the departure time field 514 of each queue data structure 506. Based on the result of the sort, Q6 is selected for the best packet to promote because it has the earliest departure time, that is, 1_1101_0010.

The current LDT is replaced with 1_1101_0010, that is, the departure time of the packet to be promoted. The packet in Q6 is promoted forward and the next packet for Q6 is fetched. Based on packet length (L), queue weight (W) and LDT, the new departure time for Q6 is computed to be 0_001_0110. Table 4 below shows the earliest departure times for each queue after the new departure time for Q6 is computed.

TABLE 4

| | |
|---|---|
| Q0: | empty |
| Q1: | 1_1110_1100 |
| Q2: | 1_1111_1111 |
| Q3: | 1_1110_0101 |
| Q4: | 1_1110_0101 |
| Q5: | 1_1110_0011 |
| Q6: | 0_0001_0110 |
| Q7: | 1_1111_0000 |
| LDT: | 1_1101_0011 |

Transpose is needed because a simple sort would result in incorrectly selecting Q6 as the queue with the earliest departure time again even though a packet was just promoted from Q6. As the zone bit in the current LDT is '1', at block 606, the earliest departure times stored in each queue are transposed resulting in the departure times shown below in Table 5.

TABLE 5

| | |
|---|---|
| Q0: | empty |
| Q1: | 0_1110_1100 |
| Q2: | 0_1111_1111 |
| Q3: | 0_1110_0101 |
| Q4: | 0_1110_0101 |
| Q5: | 0_1110_0011 |
| Q6: | 1_0001_0110 |
| Q7: | 0_1111_0000 |
| LDT: | 0_1101_0011 |

Q5 is selected as the queue with the earliest departure time; the current LDT is selected to be 0_1110_0011. No new transpose is needed until the zone in the LDT changes to '2'. At this time, the transposed value may be written back to the queue data structures. A newly active queue will use the transposed LDT. For example, if Q0 which is currently empty adds the transposed LDT to the computation of weight (W) * packet length (PL) to compute its departure time. The status of "Transpose" bit 530 stored in the node structure 518 indicates whether the transposed LDT is used.

Figure 7:
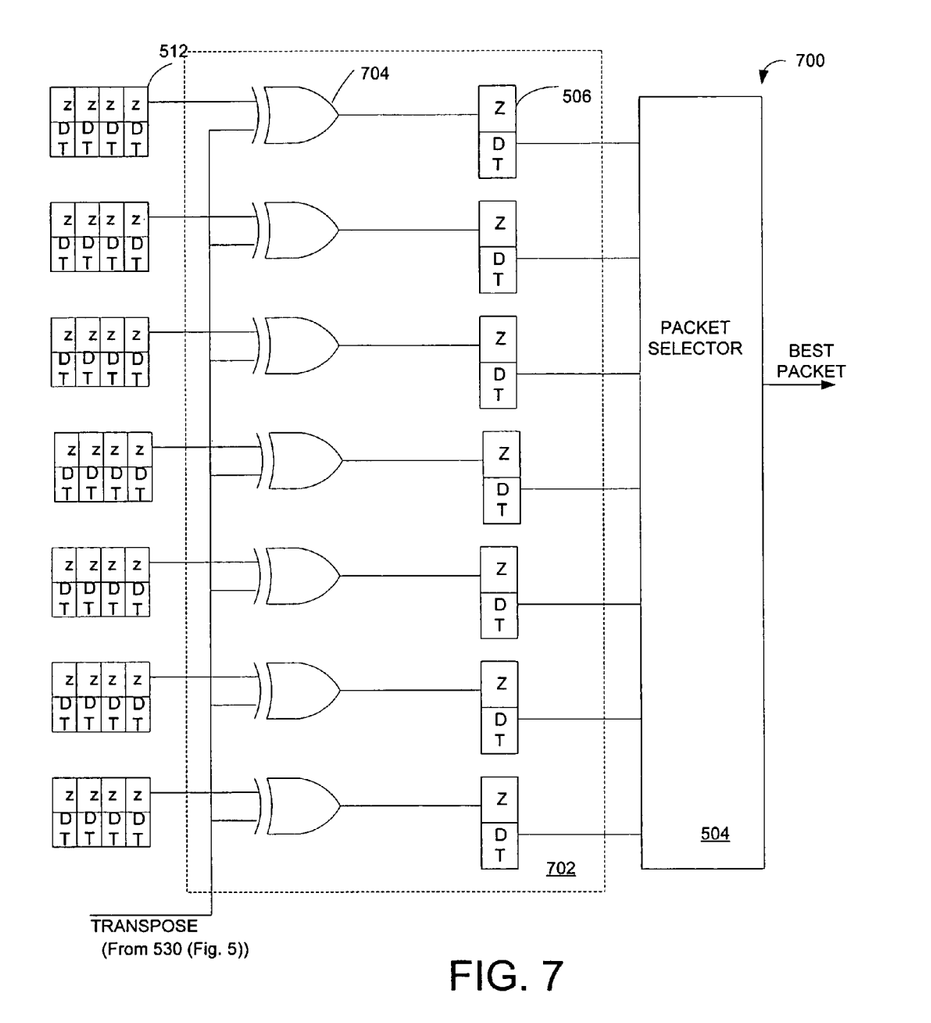
FIG. 7 is an embodiment of a scheduler that schedules packets according to the principles of the present invention.

FIG. 7 is an embodiment of a scheduler 700 that schedules packets according to the principles of the present invention. Each queue data structure (or register) includes a zone bit 512, which is also the MSb of the departure time. The zone bit 512 in each queue register is coupled to one input of an Exclusive OR (XOR) gate 704. The other input of each XOR gate is coupled to a transpose bit 530. The zone bit 512 is transposed, that is, changed from '1' to '0' or a '0' to a '1' through the XOR gate 704 if the transpose bit 530 is set to '2'. While the transpose bit is set to '0', the zone bit is passed as is through to the packet selector 504.

Thus, queue departure times are arranged in ascending order through a simple XOR operation which is very efficient compared to the conventional approach where the packet need to be sorted in different buckets before performing the final sort operation.

In an embodiment of the present invention, all the data for each of the queues that is stored in the queue data structures 506 is read once and depending upon the state of the "priority Present" bit in the node data structure, the priority or non-priority LDT is read from the node data structure. Based on the zone of the LDT, all of the zone bits associated with the departure times for each queue are "transposed" using an XOR operation if the zone bit of the LDT is "1". Otherwise no transposition is needed and the departure times for each queue are passed unchanged to the packet selector 504 to perform the final sort.

Although, an embodiment of this invention has been described for sorting departure times in ascending order, the invention is not limited to ascending order. In an alternate embodiment, sorting may be in descending order.

Although, an embodiment of this invention has been described for scheduling packets in a network processor, the invention is not limited to network processors. Embodiments of the invention may be used for scheduling any variable length data structure having a maximum length. For example, an embodiment of the invention may be used for scheduling Ethernet packets.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

What is claimed is:

1. An apparatus comprising:
   a node having a plurality of queues, each queue having an associated departure time, each departure time associated with a zone;
   a last departure time associated with the node; and
   a zone manager to arrange departure times in order by reading the departure times from all of the queues and transposing the zone associated with each departure time dependent on a state of the zone associated with the last departure time.

2. The apparatus of claim 1, wherein the zone is the most significant bit of each departure time.

3. The apparatus of claim 1, wherein each queue has an associated rate limit indication which allows rate limited nodes to be ignored.

4. The apparatus of claim 1, wherein each queue has an associated priority which is used to select the last departure time associated with the node.

5. The apparatus of claim 1, wherein the departure times are arranged in ascending order.

6. The apparatus of claim 1, wherein the zone has two states.

7. The apparatus of claim 6, wherein if the state of the zone associated with the last departure time is '0', the zone associated with each departure time is not transposed.

8. The apparatus of claim 6, wherein if the state of the zone associated with the last departure time is '1', the zone associated with the each departure time is transposed.

9. The apparatus of claim 1, wherein the zone manager includes a plurality of XOR gates, with one input of each XOR gate coupled to a respective zone bit and the other input of each XOR gate coupled to a transpose signal, such that when the transpose signal is set to '1', the XOR gate complements the zone bit.

10. The apparatus of claim 1, wherein a spread of departure times is equal to a size of a single zone.

11. A method comprising:
    associating a zone with each departure time associated with each of a plurality of queues in a node;
    storing a last departure time associated with the node; and
    arranging departure times in order by reading the departure times from all of the queues and transposing the zone associated with each departure time dependent on a state of the zone associated with the last departure time.

12. The method of claim 11, wherein the zone is the most significant bit of each departure time.

13. The method of claim 11, wherein each queue has an associated rate limit indication which allows rate limited nodes to be ignored.

14. The method of claim 11, wherein each queue has an associated priority which is used to select the last departure time associated with the node.

15. The method of claim 11, wherein the departure times are sorted in ascending order.

16. The method of claim 11, wherein the zone has two states.

17. The method of claim 16, wherein if the state of the zone associated with the last departure time is '0', the zone associated with each departure time is not transposed.

18. The method of claim 16, wherein if the state of the zone associated with the last departure time is '1', the zone associated with each departure time is transposed.

19. The method of claim 11, wherein a spread of departure times is equal to a size of a single zone.

20. A non-transitory computer usable medium including a computer readable code stored thereon having associated information, wherein the information, when accessed, results in a machine performing:
    associating a zone with each departure time associated with each of a plurality of queues in a node;
    storing a last departure time associated with the node; and
    arranging departure times in order by reading the departure times from all of the queues and transposing the zone associated with each departure time dependent on a state of the zone associated with the last departure time.

21. The computer usable medium of claim 20, wherein the departure times are arranged in ascending order.

22. The computer usable medium of claim 20, wherein a spread of departure times is equal to a size of a single zone.

23. The computer usable medium of claim 20, wherein the zone is the most significant bit of each departure time.

24. A system comprising:
    a switch fabric through which packets are received for processing;
    a node having a plurality of queues, each queue having an associated departure time for forwarding a packet received from the switch fabric, each departure time associated with a zone; a last departure time associated with the node; and a zone manager to arrange departure times in order by reading the departure times from all of the queues and transposing the zone associated with each departure time dependent on a state of the zone associated with the last departure time.

25. The system of claim 24, wherein the departure times are arranged in ascending order.

26. The system of claim 24, wherein a spread of departure times is equal to a size of a single zone.

27. The system of claim 24, wherein the zone is the most significant bit of the departure time and the last departure time.

* * * * *